Feb. 10, 1942.  R. G. BRIESE  2,272,655
VALVE
Filed May 24, 1941  2 Sheets-Sheet 1

Inventor
Rudolph G. Briese
By Clarence A. O'Brien
Attorney

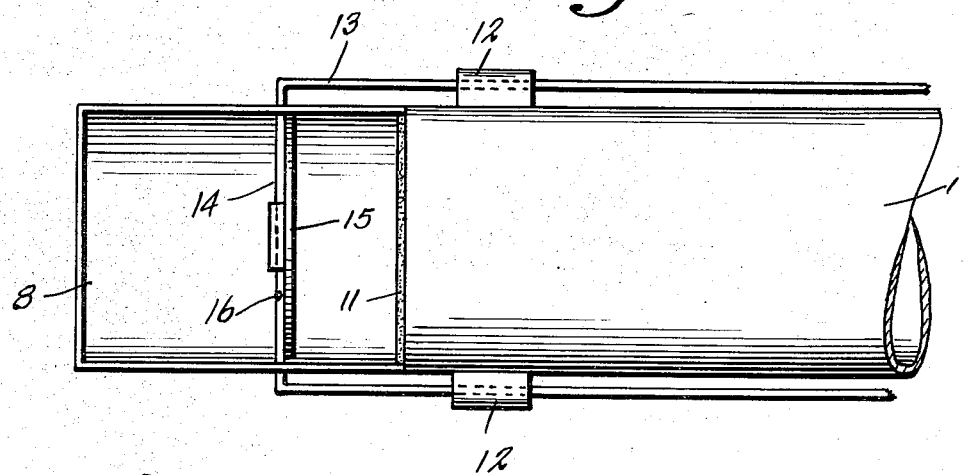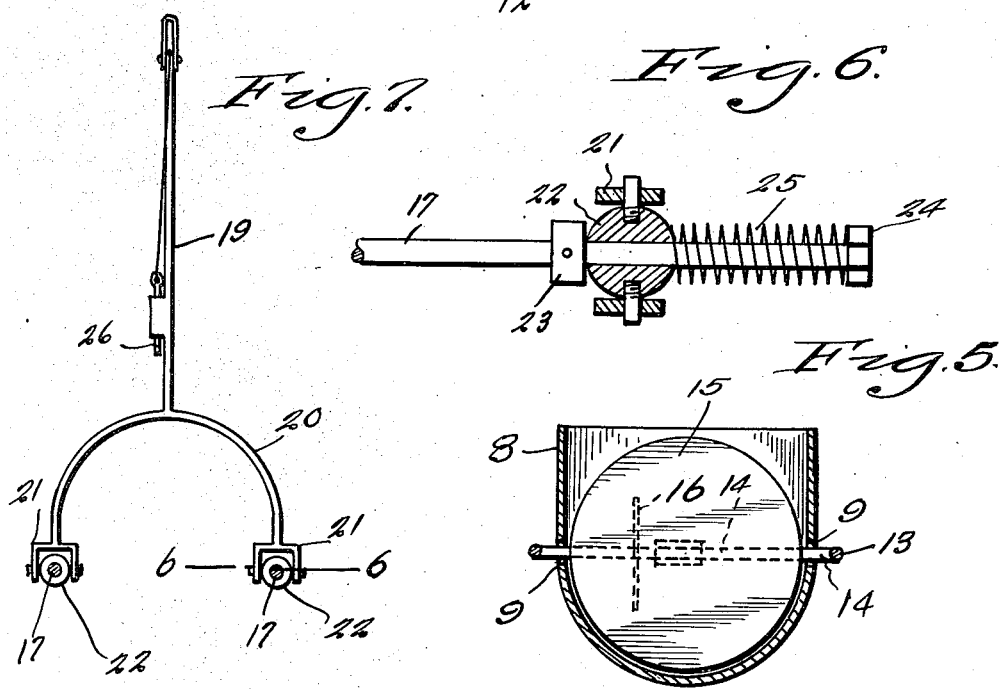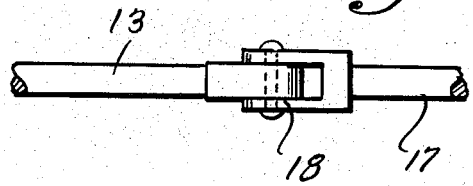

Patented Feb. 10, 1942

2,272,655

UNITED STATES PATENT OFFICE 2,272,655

VALVE

Rudolph G. Briese, Hillman, Minn.

Application May 24, 1941, Serial No. 395,106

2 Claims. (Cl. 137—69)

The present invention relates to new and useful improvements in portable siphons particularly for use in irrigating and has for its primary object to provide, in a manner as hereinafter set forth, a device of this character which is adapted to straddle a bank of an irrigation ditch and to convey water over said bank.

Another very important object of the invention is to provide a siphon of the aforementioned character comprising novel means for controlling or regulating the flow of water.

Other objects of the invention are to provide a siphon of the character described which will be comparatively simple in construction, strong, durable, highly efficient and reliable in use, compact, light in weight, and which may be manufactured at a low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a top plan view of one end portion of the device.

Figure 5 is a cross-sectional view, taken substantially on the line 5—5 of Figure 2.

Figure 6 is a detail view in horizontal section, taken substantially on the line 6—6 of Figure 7.

Figure 7 is an elevational view of one of the hand control levers, showing the valve operating rods in cross-section.

Figure 8 is a detail view in plan, illustrating the hinge connection between the sections of the valve operating rods.

Figure 1:
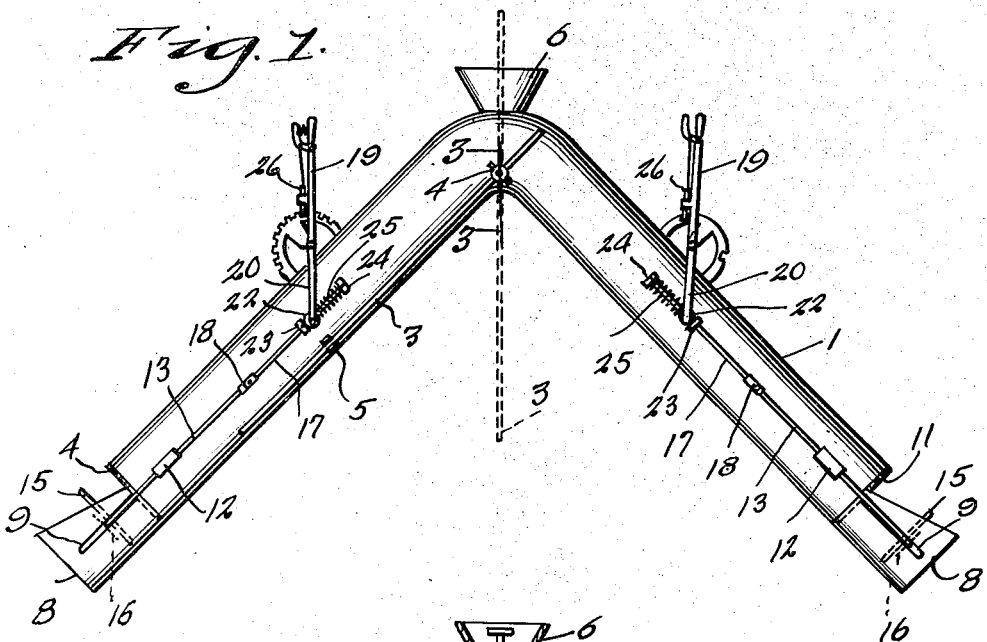
Figure 1 is a view in side elevation of a siphon constructed in accordance with the present invention, showing the valves open.
Figure 2:
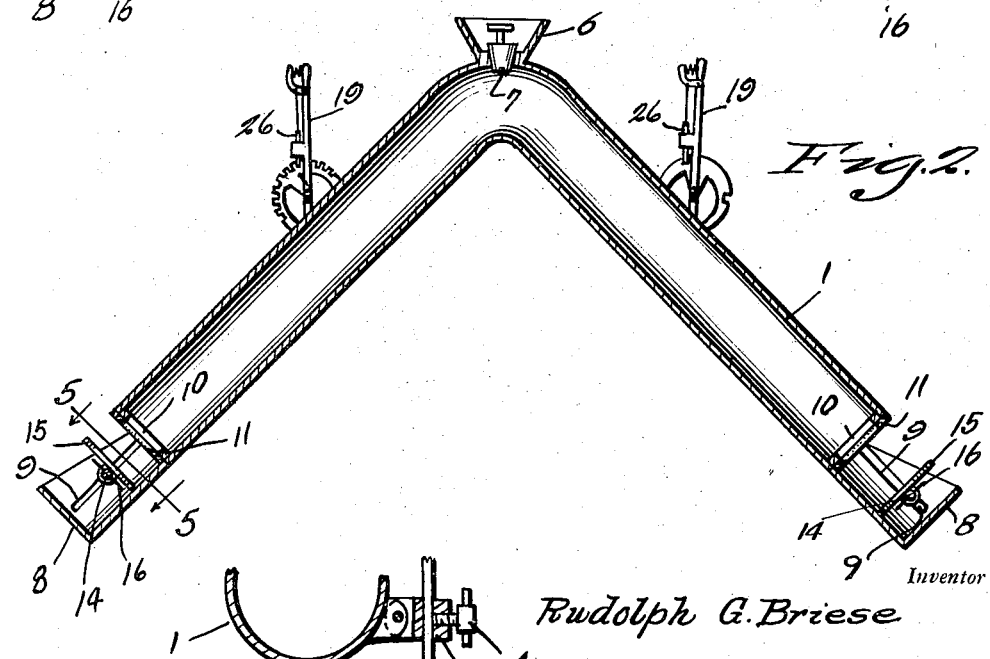
Figure 2 is a view in vertical longitudinal section through the device.
Figure 3:
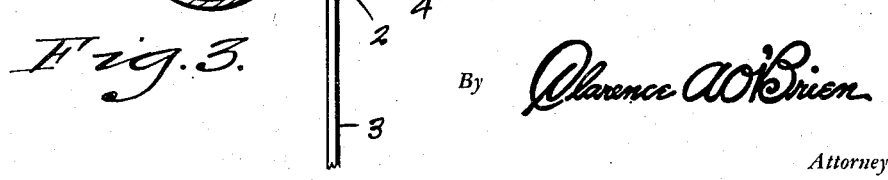
Figure 3 is a detail view in vertical section, taken substantially on the line 3—3 of Figure 1.

Referring now to the drawings in detail, it will be seen that the embodiment of the invention which has been illustrated comprises an angular pipe or conduit 1 of suitable length and diameter. The pipe 1 is adapted to straddle a bank of an irrigation ditch. Mounted on one side of the pipe 1 at the angle or bend thereof is a hinge 2. Slidably mounted on the hinge 2 is a prop 3 in the form of a rod which is secured in adjusted position by a set screw 4. The prop 3 is adapted to support the pipe 1 in an upright position when filling and starting the siphon. When not in use, the prop 3 is secured in inoperative position by a resilient clip 5 or the like on one of the legs of the pipe 1.

Mounted on the angle or bend of the pipe 1 and communicating with said pipe is a funnel 6. Communication between the funnel 6 and the pipe 1 is controlled by a removable filler plug or closure 7.

Mounted on the ends of the pipe 1 and projecting longitudinally therefrom are combined guards and baffles 8. The guards 8 taper from substantially segmental inner ends where they join the pipe 1 to substantially U-shaped outer ends. The tops of the guards 8 are open, the outer ends thereof being closed. Longitudinal slots 9 are provided in the sides of the guards 8, the purpose of which slots will be presently set forth.

Mounted in the end portions of the pipe 1 are annual seats 10 the faces of which are provided with suitable gaskets 11. Slidably mounted in guides 12 on the end portions of the pipe 1 are substantially U-shaped rods 13. The connecting or bight portions 14 of the substantially U-shaped rods 13 are slidable in the slots 9 in the guards 8.

Pivotally mounted on the bight portions 14 of the rods 13 are valves 15 in the form of discs which are engageable with the seats 10. Swinging movement of the valves 15 is limited through the medium of pins 16 which are mounted on the portions 14 of the rods 13.

The rods 13 further include end extensions 17 which are pivotally connected to said rods by hinges 18. Pivotally mounted on intermediate portions of the legs of the pipe 1 are hand levers 19. On the pivoted ends of the levers 19 are forks 20 which straddle the pipe 1. As illustrated to advantage in Figures 6 and 7 of the drawings, the arms of the forks 20 terminate in yokes 21 having rotatably mounted therein apertured balls 22. The rod sections 17 pass slidably through the balls 22. Collars 23 are fixed on the rod sections 17 for engagement with the balls 22 for positively limiting inward sliding movement of said rod sections. Nuts 24 are threaded on the inner end portions of the rod sections 17. Coil springs 25 encircle the inner end portions of the rod sections 17 and have one end engaged with the balls 22 and their other ends engaged with the nuts 24 for yieldingly urging the valves 15 toward closed position on the seats 10.

It is thought that the operation of the device will be readily apparent from a consideration of the foregoing. Briefly, the angular pipe 1 is positioned across a bank of an irrigation ditch with the outlet end of said pipe lowermost. At this time the pipe 1 is supported in an upright position through the medium of the adjustable prop 3 which is engaged with the ground. With the valves 15 closed the pipe 1 is filled with water through the funnel 6 after removing the closure 7. Of course, after the pipe 1 has been thus filled, the closure 7 is replaced. The inlet valve on the intake end of the pipe 1, which is submerged in the water in the ditch, is now opened through the medium of its respective hand lever 19. The valve 15 on the outlet end of the pipe 1 is then opened to the desired position and the siphon begins to function in an obvious manner. The prop 3 is then swung to inoperative position where it is retained by the clip 5 and the pipe 1 is then swung laterally in a manner to rest on the bank of the ditch for maximum operating efficiency. The hand levers 19 are provided with suitable latches 26 for securing the valves 15 in adjusted position. It will be observed that there are but two adjustments for the intake valve whereby said intake valve is secured only in either fully opened or fully closed position. However, substantially any desired adjustment of the outlet valve may be made. The guards 8 protect the valves 15 and assure the free operation thereof in addition to preventing the washing away of the soil adjacent the ends of the pipe 1.

It is believed that the many advantages of a portable irrigation siphon constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A device of the class described comprising a pipe, a substantially trough-shaped guard on an end of the pipe communicating therewith, said guard having longitudinal slots in its side walls, a substantially U-shaped rod slidable on the pipe and operable in the slots, a valve pivotally mounted on the bight portion of said rod and operable in the guard for closing the end of the pipe, a hand lever mounted on the pipe, and means operatively connecting the rod to the hand lever for actuation thereby.

2. A device of the class described comprising a pipe, a substantially trough-shaped guard on an end of the pipe communicating therewith, said guard having longitudinal slots in its side walls, a substantially U-shaped rod slidable on the pipe and operable in the slots, a valve pivotally mounted on the bight portion of said rod and operable in the guard for closing the end of the pipe, a hand lever mounted on the pipe, means operatively connecting the rod to the hand lever for actuation thereby, said means including a fork on the pivoted end of the lever straddling the pipe, balls pivotally mounted on the end portions of said fork, extensions pivotally connected to the ends of the rod and passing slidably through said balls, and coil springs yieldingly connecting said extensions to the balls for actuation in one direction thereby.

RUDOLPH G. BRIESE.